Aug. 21, 1945. B. DRAKE 2,383,177

ELECTRIC FREQUENCY DIVIDING SYSTEM.

Filed Aug. 10, 1943 3 Sheets-Sheet 1

Inventor:
Bernard Drake,
By
Pierce & Scheffler,
Attorneys.

Inventor:
Bernard Drake,
By
Pierce & Scheffler,
Attorneys.

Patented Aug. 21, 1945

2,383,177

UNITED STATES PATENT OFFICE 2,383,177

ELECTRIC FREQUENCY DIVIDING SYSTEM

Bernard Drake, Bromley, England

Application August 10, 1943, Serial No. 498,121
In Great Britain August 27, 1942

9 Claims. (Cl. 172—281)

The invention relates to electric frequency dividing systems.

In particular the invention relates to sub-harmonic frequency converters comprising reactive elements, one at least of which is non-linear, oscillations therein at a sub-harmonic frequency being maintained when fed with a single phase voltage of fundamental frequency. It is known that a converter of the type referred to has an input current comprising components of the sub-harmonic frequency and multiples thereof. From the power supply point of view, therefore, the current waveform, power factor and volt-ampere efficiency are poor. The object of the present invention is to effect, in such converters an improvement in the input current waveform and power factor, as well as to effect an increase of efficiency. The invention is therefore particularly suited to large converters handling large amounts of power, where considerations of power factor and efficiency are of importance and outweigh considerations of extreme simplicity and the like. A further advantage of the invention is that harmonic components may be substantially eliminated from the output voltage.

The invention consists broadly of a sub-harmonic frequency converter comprising reactive elements, one at least of which is non-linear, oscillations therein at a sub-harmonic frequency being maintained when fed with a single phase voltage of fundamental frequency, in which two or more converting paths having different phase relationships, are provided. The arrangement may be such that one or more iron cored inductances in each converting path are combined together in a single polyphase iron circuit.

In its preferred form the number of converting paths employed is equal to the order of the sub-harmonic being converted, the sub-harmonic oscillations comprising a polyphase current system of the same order.

Further features of the invention reside in the connection of reactive means across the input to the converting paths whereby the input current component of the fundamental frequency is brought into phase with the supply voltage; the provision of filter means in the input circuit to reduce the amplitude of the harmonic components of the input current delivered from the voltage source to the converter; the inclusion of means to couple the polyphase converting paths to a single phase sub-harmonic output circuit, the coupling being so arranged as to distribute the output power load evenly between the converting paths; the provision of transformer windings tightly coupled to each of the sub-harmonic oscillating circuits and joined together in mesh connection; the provision of filter means in the output circuit to reduce or eliminate harmonic components of unwanted frequency from the output voltage, the filter means preferably comprising one or more resonance circuits shunted across the output and tuned to the unwanted frequencies; the provision of means to initiate automatically oscillations of sub-harmonic frequency in the converting paths of the required phase relationship; and the inclusion in the path of mesh connected transformer windings coupled to each of the sub-harmonic oscillating circuits of a discriminating relay arranged to operate if the oscillating currents are not in timed phase relationship.

In the preferred embodiment of the invention, the number of converted paths provided is as before indicated equal to the order of the sub-harmonic being converted, the phase relationships of the low frequency currents being so arranged as to comprise a polyphase system of the same order. For instance, if the third sub-harmonic is required, three converting paths are provided and the low frequency oscillating currents are arranged so as to form a 3-phase system of one third the frequency of the input voltage. If the converting paths are identical and loaded to the same extent, the currents flowing in them will be the same except for the phase differences. Thus the components of sub-harmonic frequency will each be displaced $$\frac{2\pi}{N}$$

and for the components of fundamental frequency $$\frac{2\pi}{N} \times N = 2\pi$$

where N is the order of the sub-harmonic being converted. Since there are N equal components of sub-harmonic frequency, each displaced in phase by $$\frac{2\pi}{N}$$

they will exactly balance one another, if added together, so that no component of this frequency will flow in the input circuit. The components of fundamental frequency, however, are each displaced in phase by $2\pi$ and are hence effectively in phase, so that the current of fundamental frequency flowing in the input circuit will be N times the value of that in each converting path.

Similar considerations show that all current components will be balanced out in the input circuit, the frequencies of which are multiples of the sub-harmonic, with the exception of those which coincide with the fundamental or its multiples. If the system is perfectly balanced, therefore, the input current will comprise components only of the fundamental frequency and multiples thereof. Since the components of the input current of fundamental frequency and multiples thereof in single path converters of the kind referred to, in general are lower in effective value than the remainder of the component it will be appreciated that the embodiment above described which balances out these greater components provides a considerable reduction in input current as well as a corresponding increase in power factor and improvement in waveform.

It is to be understood that one or more of the iron cored inductances in each converting path may have separate iron circuits or may be combined together on a single polyphase iron circuit. Thus, for instance, in the case of frequency division by three, the output transformers may have their windings on separate iron circuits, or on the three cores of a single polyphase transformer.

The invention additionally involves the use of a condenser or other reactive device connected across the input to a sub-harmonic converter having two or more converting paths so as to bring the current component of fundamental frequency substantially into phase with the applied voltage and thus to increase still further the power factor of the input current, and hence also the volt-ampere efficiency of the system.

Further, the invention involves the use of filter means, included in the input circuit to a converter of the type described, to reduce the value of one or more components of the input current whose frequencies are multiples of the fundamental. Such a filter might comprise a capacity shunted across the input terminals to the converter, together with inductance included between the converter and the voltage source. Such inductance might be comprised by a choke or the leakage inductance of a transformer.

The invention, moreover, involves the use of means, such for instance as transformers, to couple the polyphase converting paths to a single phase sub-harmonic output circuit. Preferably this coupling is so arranged as to distribute the sub-harmonic output load evenly between the converting paths. Thus in the case of division by three in which the low frequency oscillations comprise a 3-phase system, the output circuit consists of two transformer windings associated with two of the phases joined in series aiding each other, but in series opposition to a third winding associated with the third phase which has half the number of turns of the other two. The output voltage will be 3 times that across the last mentioned winding, but the waveshape will be somewhat different due to the phase reversal of certain harmonics—those of supply frequency and multiples thereof.

Means may also be provided substantially to eliminate unwanted frequency components from the output voltage waveform. Thus, transformer windings having the same number of turns, associated with each of the low frequency oscillating circuits, may be joined together in mesh connection. In the three phase case mentioned above, the windings are therefore connected in delta. The voltage components of sub-harmonic frequency, being thus displaced in phase by $\frac{2\pi}{3}$ then exactly balance one another, so that no current of this frequency flows in the delta. The voltage components of fundamental frequency, however, are displaced by $2\pi$ and are thus in phase, so that the delta circuit acts as a short circuit for this frequency. This component will therefore be substantially eliminated from the output voltage. Further analysis shows that this arrangement eliminates all components of the output voltage of fundamental frequency and multiples thereof.

Filter means, in the output circuit, in conjunction with sub-harmonic converters of the type described may also be employed, in order to reduce components of unwanted frequency from the output voltage. Such a filter might comprise one or more series resonant circuits tuned to one or more multiples of the sub-harmonic frequency shunted across the output terminals.

When the invention is applied to converters of the type in which sub-harmonic oscillations can only be maintained if such oscillations are first initiated, the use of starting means to initiate oscillations of the correct phase relationship in the converting paths is resorted to. Such starting means may include electro-mechanical elements, such as relays.

In order that the invention may be clearly understood and readily carried into practice it is illustrated diagrammatically, by way of example only, in the accompanying drawings, in which.

Figure 1:
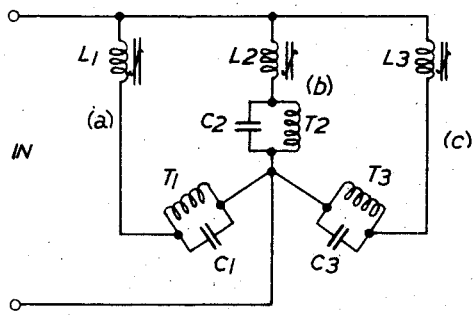
Figure 1 is a circuit diagram illustrating the basic principle of the invention as applied to a three path converter, whereby the basic frequency is divided by three.

Figure 1 illustrates the basic principle of the invention in the case of a frequency converter intended to divide the supply frequency by three. There are three converting paths $a$, $b$ and $c$ comprising oscillating circuits $C_1$, $T_1$, $C_2$, $T_2$ and $C_3$, $T_3$ respectively, and iron-cored inductances $L_1$, $L_2$, $L_3$ constitutes chokes in the individual converting paths. As indicated, the iron cores are saturable. The sub-harmonic components of the oscillating currents flowing in the three converting paths are out of phase with one another, and the sub-harmonic components provide a three-phase system whose output voltages appear across windings $T_1$, $T_2$ and $T_3$. These windings $T_1$, $T_2$ and $T_3$ may be the primary windings of transformers, the secondary windings of which provide the output voltages of the converter paths.

Figure 2:
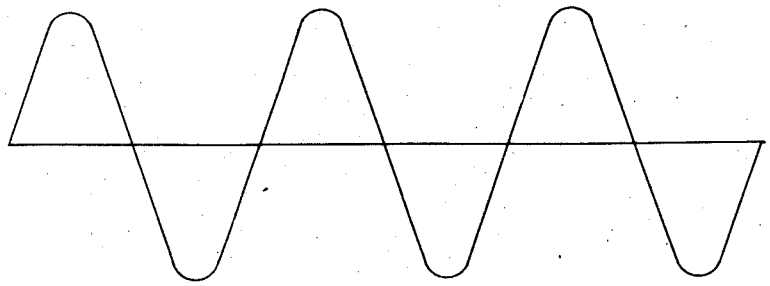
Figures 2, 3 and 4 are voltage and current curves, hereinafter described in detail, illustrating the action of the apparatus.
Figure 3:
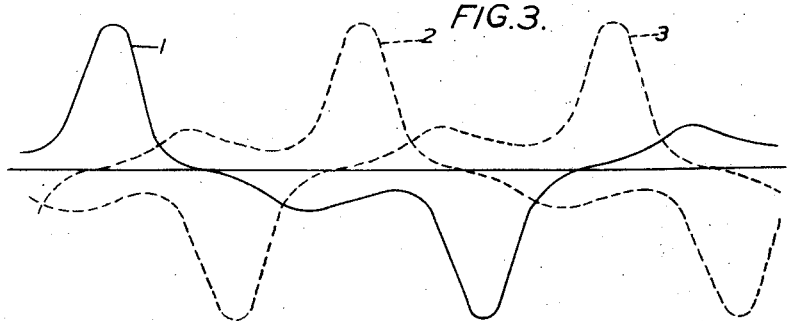
Figure 4:
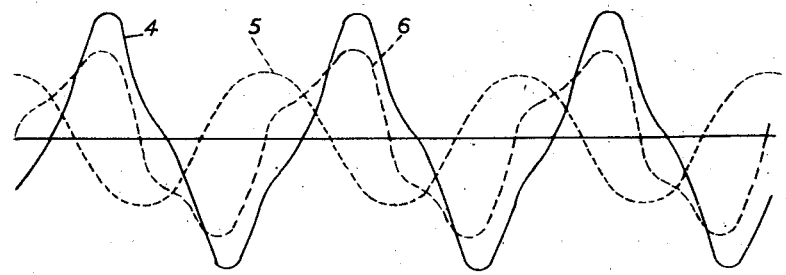

Referring now to Figs. 2, 3 and 4, Figure 2 shows three cycles of sinusoidal voltage assumed to be applied to the system, Figure 3 shows the currents absorbed from the supply by the several converting paths and indicated as 1, 2 and 3 respectively. In Figure 4, the reference 4 indicates the resultant current flowing in the input circuit obtained by adding the curves 1, 2, 3 of Figure 3 together.

Figure 5:
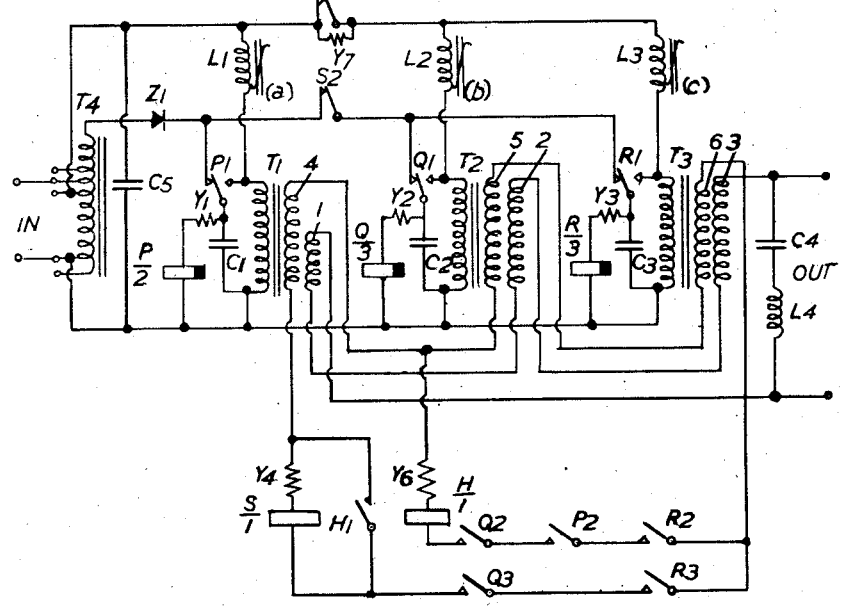
Figure 5 is a circuit diagram of a practical system embodying the invention.

Figure 5 illustrates a practical circuit embodying the invention, components corresponding to those of Figure 1 having the same references applied thereto. As in the case of Figure 1 there are three converting paths $a$, $b$ and $c$ passing respectively through the three chokes $L_1$, $L_2$, $L_3$ and three transformers $T_1$, $T_2$, $T_3$. A condenser $C_5$ is connected across the input of the converter, so that the supply taken from the main is the leading current shown by the curve 5 of Figure 4.

The three phase output voltages appearing across the terminals of transformers $T_1$, $T_2$, $T_3$ are combined into a single phase output voltage by connecting secondary windings 2 and 3 in phase opposition to winding 1. Windings 2 and 3 also have twice the number of turns of winding 1, in order to divide the load power evenly between the converting paths. Curve 6 of Figure 4 shows the resultant input current absorbed from the supply obtained by adding curves 4 and 5 together. The harmonic components of the input current wave 6 may be reduced by means of inductance in series with the input, such as by the leakage of input transformer $T_4$, or an additional choke (not shown).

The starting of oscillations in the converting paths is achieved by the means described in copending application Serial No. 447,260, filed June 16, 1942, by Leslie Howard Paddle and Bernard Drake. Condensers $C_1$, $C_2$, $C_3$ in parallel with the primary windings of transformers $T_1$, $T_2$, $T_3$ are charged to their normal peak working value through switches $P_1$, $Q_1$ and $R_1$, and rectifier $Z_1$, from the step-up input transformer $T_4$, which is tapped to allow the converter to be used on power lines of different voltages.

When condensers $C_1$, $C_2$, $C_3$ are fully charged the slugged starting relays $P/2$, $Q/3$ and $R/3$ operate through voltage dropping resistance $Y_1$, $Y_2$ and $Y_3$, to throw over switches $P_1$, $Q_1$, and $R_1$, and so to introduce the condensers into the converting paths, thus giving them the necessary impulse. If oscillations are not maintained following the first stroke of the relay, the armature falls off, so that switch $P_1$, $Q_1$ or $R_1$ resumes charging position, when the corresponding condenser picks up a further charge and then re-operates.

When all the paths have started oscillating the closed "make" switches $Q_3$ and $R_3$ complete the delta circuit formed by secondary windings 4, 5 and 6 of transformers $T_1$, $T_2$ and $T_3$ through discriminating relay $S/1$ and voltage dropping resistance $Y_4$. If the oscillations are not in correct three phase relationship the low frequency voltage components in windings 4, 5 and 6 will not balance out, and relay $S/1$ will operate to open switches $S_1$ and $S_2$, thus disconnecting the second and third converting paths $b$, $c$. $Y_7$ is a spark quenching resistance to absorb the power of the dying oscillations. Starting relays $Q/3$ and $R/3$ then release, and the opening of switches $Q_3$ and $R_3$ disconnects relay $S/2$, in consequence of which converting paths $b$ and $c$ are reconnected via switches $S_1$, $S_2$.

If, when the oscillators re-start, they are in correct three phase relationship, the low frequency voltage components in windings 4, 5 and 6 will balance out, so that $S/1$ remains unoperated. The slugged relay $H/1$ is then operated through switches $P_2$, $Q_2$ and $R_2$ and voltage dropping resistance $Y_6$ by the combined voltages of windings 5 and 6. The consequent closing of switch $H_1$ shorts out relay $S/1$ and resistance $Y_4$, so that the voltage components of the supply frequency and multiples thereof are removed from the output circuit.

Should any of the converting paths cease oscillating at any time, relay $H/1$ will be released, thus putting the discriminating relay $S/1$ back into circuit.

The resonant circuit $C_4$, $L_4$ is tuned to a frequency between the 5th and 7th harmonics of the desired output frequency, so that by this means all harmonics up to and including the 9th are substantially removed from the output. Harmonics of higher order are negligible.

As previously mentioned, the multi-path converter may be started by means of an external polyphase source of low frequency, or by means of a motor arranged to operate contacts to give properly timed starting impulses to the various paths.

Figure 6:
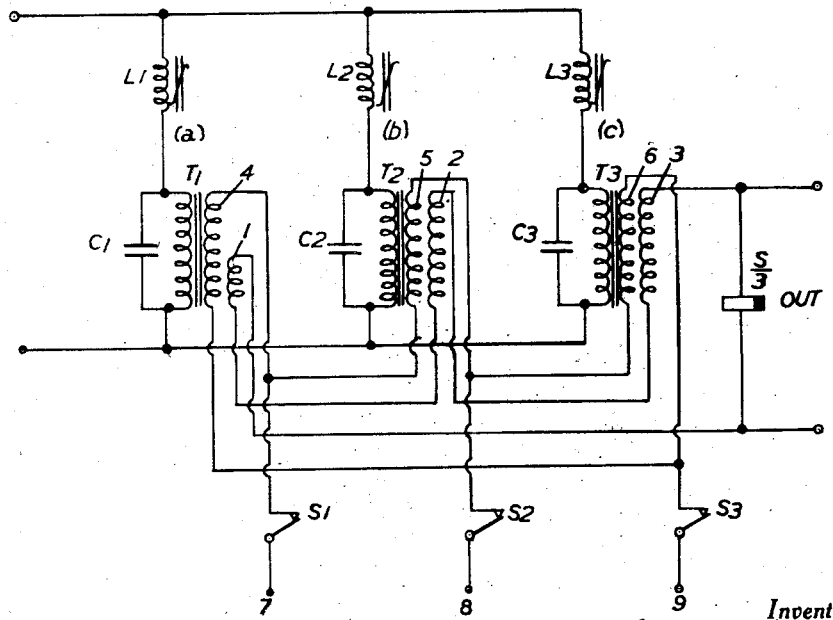
Figure 6 is another circuit diagram illustrating a modification of the system illustrated by Figure 5.

Figure 6 shows diagrammatically a simple automatic method for starting a three path converter from an external three phase low frequency source 7, 8 and 9. The circuit is basically similar to that of Figure 5, but the delta connected transformer secondary windings 4, 5 and 6 are connected to the starting sources 7, 8 and 9 through relay contacts $S_1$, $S_2$, $S_3$. After a short delay sufficient to initiate the low frequency oscillations the slugged relay $S/3$ connected across the output circuit operates and disconnects the converter from the starting source. The relay $S/3$ then remains operated as long as the correct voltage is maintained across the output terminals.

Figure 7:
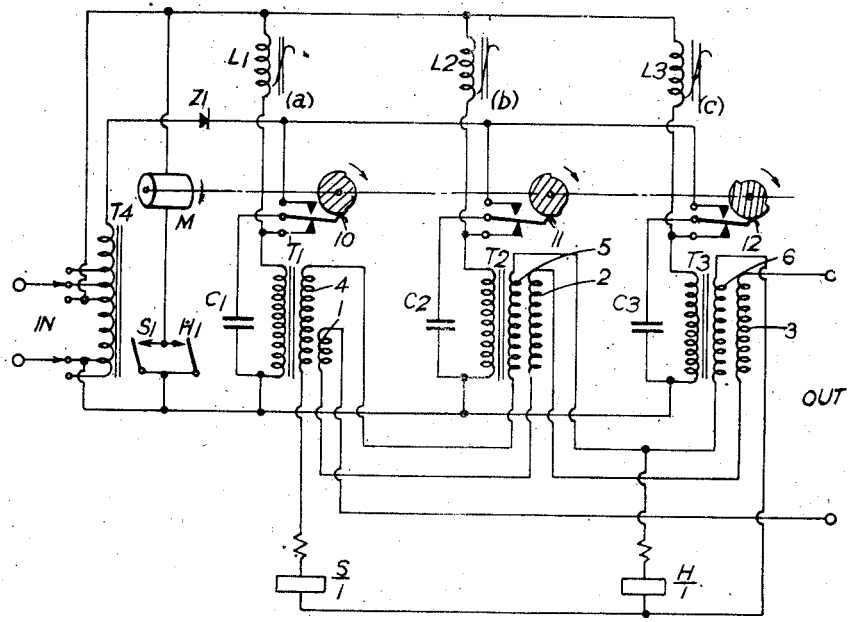
Figure 7 is a diagram illustrating another modification of the system illustrated by Figure 5, and Figures 8 and 9 illustrate further modifications.

Figure 7 illustrates an impulse method of starting by means of a motor M. The geared down shaft of this motor carries three cams 7, 8 and 9, operating the change-over contacts 10, 11 and 12. The cams and relays are shown in position prior to starting and the system as a whole is similar to that of Figure 5.

The motor M is started from the supply via contact $H_1$, and as it rotates the contacts 10, 11 and 12 are changed over by the cams 7, 8 and 9 respectively. The condensers $C_1$, $C_2$ and $C_3$ become disconnected from their converter paths and charged from the main supply through rectifier $Z_1$. Cams 7, 8 and 9 then operate contacts 10, 11 and 12 in turn at the appropriate moments so as to connect the charged condensers $C_1$, $C_2$, $C_3$ in circuit, and thus start oscillations of correct polyphase relationship. The relay $H/1$ is in this case connected across transformer winding 6, so that its contact $H_1$ is only operated to disconnect the motor M from the supply when the third converter path $c$ is oscillating. Relay $S/1$ included in the circuit of delta connected windings 4, 5 and 6 is so arranged that its contact $S_1$ only disconnects the motor M when there is no effective voltage in the mesh circuit. Thus while the converter is supplied with power, the motor M remains stationary so long as the converting paths are oscillating in correct three phase relationship.

Figure 8:
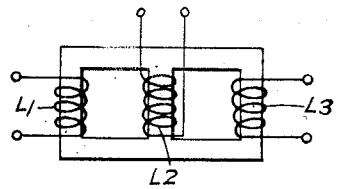
Figure 9:
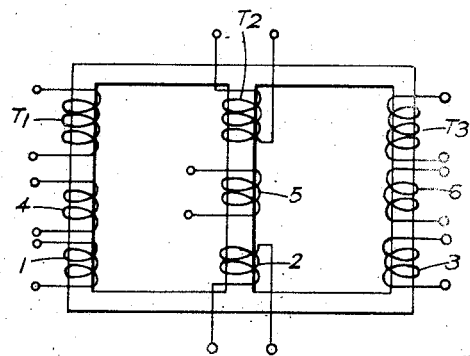

Various modifications may be made in the circuits and arrangements hereinbefore described, without departing from the invention. For example, as already mentioned, the several iron cored inductances in the converting paths may be combined together so as to provide a single polyphase iron circuit, as illustrated by Figure 8 in the case of inductances $L_1$, $L_2$, $L_3$, or as illustrated by Figure 9 in the case of transformers $T_1$, $T_2$, $T_3$.

What I claim and desire to secure by Letters Patent is:

1. A frequency converter network comprising input terminals for connection to a single phase source of alternating current, a plurality of reactive frequency converting paths connected between said input terminals, each path including at least one non-linear reactive circuit element, an output circuit resonant at a sub-harmonic frequency of said single phase source, said output circuit having circuit elements coupled to each of said converting paths, and means establishing a phase displacement between currents in the several converting paths.

2. A frequency converter network as recited in claim 1, wherein the number of converting paths is equal to the order of the sub-harmonic, and the circuit elements of the output circuit are connected to form a polyphase alternating current system of the same order.

3. A frequency converter network as recited in claim 1, in combination with reactive means across said input terminals for bringing the input current from said source into phase with the voltage of said source.

4. A frequency converter as recited in claim 1, in combination with filter circuit means for suppressing harmonic components in the single phase input current.

5. A frequency converter as recited in claim 1, in combination with filter circuit means for suppressing harmonic components in the sub-harmonic output circuit.

6. A frequency converter network comprising input terminals for connection to a single phase source of alternating current, a plurality of phase-displaced frequency converting paths connected across said input terminals each converting path including a non-linear reactive impedance in series with the primary of a transformer, network output terminals, and an output circuit resonant at a sub-harmonic of said single phase source connected across said output terminals, said output circuit comprising the secondaries of said transformers connected to form a single phase sub-harmonic output circuit.

7. A frequency converter network as recited in claim 6, wherein said transformers include additional windings tightly coupled to said primaries and connected together to establish the phase displacement between currents in the several transformers.

8. A frequency converter network as recited in claim 6, in combination with a series resonant filter circuit shunted across said output terminals and tuned to an unwanted hermonic of the output frequency.

9. A frequency converter network as recited in claim 6, wherein said transformers are iron cored, the cores being combined to form a single polyphase iron circuit.

BERNARD DRAKE.